(No Model.)
G. M. IRWIN.
GLASS MOLD.
No. 415,868. Patented Nov. 26, 1889.
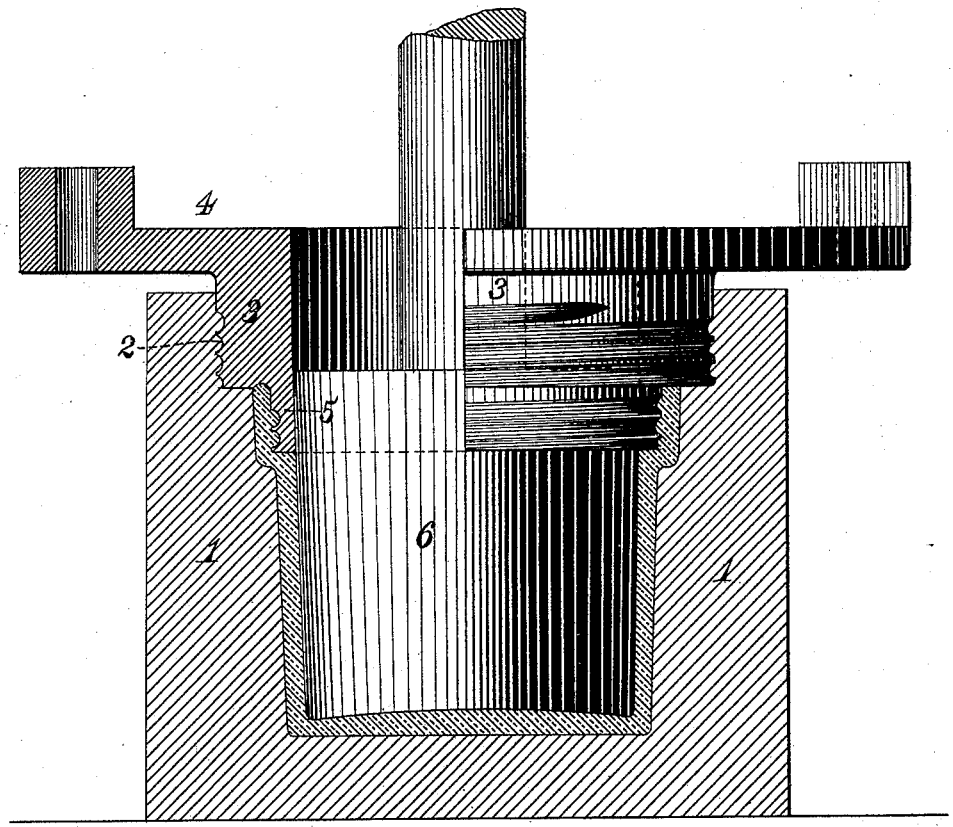
WITNESSES:
Danwm B. Wolcott
F. E. Gaither.
INVENTOR,
George M. Irwin
by George H. Christy
Att'y.
N. PETERS, Photo-Lithographer, Washington, D. C.

UNITED STATES PATENT OFFICE.

GEORGE M. IRWIN, OF PITTSBURG, PENNSYLVANIA.

GLASS-MOLD.

SPECIFICATION forming part of Letters Patent No. 415,868, dated November 26, 1889.

Application filed August 26, 1889. Serial No. 321,939. (No model.)

*To all whom it may concern:*

Be it known that I, GEORGE M. IRWIN, a citizen of the United States, residing at Pittsburg, in the county of Allegheny and State of Pennsylvania, have invented or discovered a certain new and useful Improvement in Glass-Molds, of which improvement the following is a specification.

The invention described herein relates to certain improvements in molds for jelly-glasses and like articles, wherein the cover, or a portion thereof, fits within the glass and interlocks therewith by screw-threads or other analogous locking devices. Heretofore these screw-threads have been formed on the interior of the glass article by means of grooves formed on the face of a part of the plunger movable independently of the main portion thereof. This manner of forming the interlocking devices is impracticable, as it requires too long a time to manipulate the plunger, the independently-movable section, and the mold-ring, the glass being cracked or crippled.

The object of this invention is to provide a mold and connections which can be operated with sufficient rapidity to prevent any injury to the article.

In the accompanying drawing, forming a part of this specification, is shown, partly in section and partly in elevation, a mold embodying my invention.

The body 1 of the mold is made in two or more parts, as is customary, having a suitable article-shaping cavity. The upper edge of the mold is rabbeted, forming a ring 2, integral with the mold proper, the vertical walls of the ring being internally threaded, as shown, for the reception of the annular externally-threaded shoulder or boss 3 of the mold-ring 4. The shoulder or boss 3 is provided with a depending flange 5, extending down into the mold-cavity, and having an external diameter smaller than the internal diameter of the mold at its upper end by an amount equal to or approximately equal to twice the desired thickness of the article at its upper end or neck, thus producing a cavity for the formation of the neck of the article. The outer surface of the flange 5 is provided with a spirally-arranged groove or rib corresponding in pitch to the thread formed on the shoulder or boss 3. The plunger 6 is of the usual form or construction, and is adapted to move freely, but not loosely, through the mold-ring.

In using my improved mold the ring 4 is first screwed down into position on the mold, a proper quantity of glass placed therein, and the plunger moved down, thereby causing the glass to not only spread into the space between the plunger and the mold, but also into the space between the externally-threaded flange 5 and the wall of the mold-cavity, thus producing on the interior wall of the neck of the article a spirally-arranged rib or groove, in accordance with the construction of the flange 5. As soon as the glass has been pressed the plunger is withdrawn and the mold-ring unscrewed, the threads of the mold and boss or shoulder 3 supporting and lifting the mold-ring as it is turned, thus preventing any distortion of the neck of the article or the thread formed thereon. It will be observed that the end of the flange forms an internal shoulder on the article which will serve as a support for a diaphragm for protecting the contents of the article formed.

I claim herein as my invention—

The combination of a mold having an internally-threaded ring formed on its upper end, a mold-ring provided with an annular externally-threaded boss or shoulder, said boss or shoulder having an externally ribbed or grooved flange depending therefrom, and a plunger entering the mold through the mold-ring, substantially as set forth.

In testimony whereof I have hereunto set my hand.

GEORGE M. IRWIN.

Witnesses:
 WILLIAM BEAL,
 DARWIN S. WOLCOTT.